United States Patent [19]

Konig

[11] Patent Number: 4,734,846
[45] Date of Patent: Mar. 29, 1988

[54] APPARATUS FOR PROVIDING AN INDICATION OF COMPACTION IN VIBRATION COMPACTING MACHINES

[75] Inventor: Fritz Konig, Wuppertal, Fed. Rep. of Germany

[73] Assignee: Case Vibromax GmbH & Co. KG, Fed. Rep. of Germany

[21] Appl. No.: 743,164

[22] Filed: Jun. 10, 1985

[30] Foreign Application Priority Data

Jun. 13, 1984 [DE] Fed. Rep. of Germany ....... 3421824

[51] Int. Cl.$^4$ ........................ G05D 19/00; E01C 19/28
[52] U.S. Cl. ........................................ 364/153; 73/78; 73/573; 404/117; 404/133
[58] Field of Search ............... 364/153; 73/573, 78; 404/117, 133

[56] References Cited

U.S. PATENT DOCUMENTS

| | | | |
|---|---|---|---|
| Re. 31,195 | 4/1983 | Thurner | 73/573 |
| 3,775,019 | 11/1973 | Konig et al. | 404/133 |
| 4,344,128 | 8/1982 | Frye | 364/153 X |
| 4,467,652 | 8/1984 | Thurner et al. | 73/573 |
| 4,546,425 | 10/1985 | Breitholtz | 364/153 |
| 4,647,247 | 3/1987 | Sandstrom | 404/117 |

FOREIGN PATENT DOCUMENTS 673215 12/1965 Belgium .
2066015 2/1979 Fed. Rep. of Germany .
1372567 10/1974 United Kingdom .

Primary Examiner—Jerry Smith
Assistant Examiner—Clark A. Jablon
Attorney, Agent, or Firm—Laney, Dougherty, Hessin & Beavers

[57] ABSTRACT

Method and apparatus for providing an indication of compaction in vibration compacting machines. A signal proportional to acceleration occuring when the working part of a vibrating compaction machine strikes soil is developed by means of an acceleration pick-up and is compared with a stepped sequence of potentials representative of preselected acceleration values. During consecutive observation intervals it is observed which of these potentials are exceeded and which are not exceeded by the maximum acceleration occuring in an observation interval. In one embodiment, a control signal is developed which provides an indication of the compaction. The control signal is used to change the preselected acceleration values dependent upon the degree of compaction. Another embodiment of the invention develops a signal which is used to change the distance between the preselected acceleration values independent of the control signal.

33 Claims, 10 Drawing Figures

APPARATUS FOR PROVIDING AN INDICATION OF COMPACTION IN VIBRATION COMPACTING MACHINES

BACKGROUND AND SUMMARY OF THE INVENTION

The instant invention relates to apparatus for providing an indication of compaction in vibration compacting machines of the type which comprise:
 (a) a vibrating working part;
 (b) an acceleration pick-up mounted on the vibrating working part;
 (c) means for preselecting an acceleration value;
 (d) means for preselecting consecutive observation intervals;
 (e) means for responding to whether or not the preselected acceleration value is exceeded within each observation interval; and
 (f) control means for increasing or reducing the preselected acceleration value depending on whether such an acceleration occurs or does not occur.

Belgium Pat. No. 673 215 discloses an acceleration pick-up which is mounted on a vibrating roller. The output signal is processed to generate a signal corresponding to the amplitude of the vibrating roller. When this signal attains a certain magnitude, an indicating or control signal is triggered. The device disclosed in the Belgium patent was designed based on the assumption that the compacting effect of the soil compacting machine is optimum when the vibrating roller oscillates with the resonant frequency of the soil to be compacted because the oscillation amplitude of the roller is at its maximum and thus the effect on the soil to be compacted is maximized. This assumption is not always justified because it presumes that the vibrating roller or working part makes a harmonic movement.

The working part of many dynamic soil compacting machines does not make a harmonic movement but rather operates in a jumping fashion. The working part describes a substantially balistic trajectory under the action of gravity and possible pre-loading forces. The harmonic excitation forces of the vibration generator may not be in the direction of travel of the working part when it hits the soil. When the excitation forces at this moment are directed downwardly, they support the impact effect of the working part when hitting the soil. However, the impact effect is diminished when the excitation forces are at this moment directed upwardly. When this occurs, oscillation amplitude is not a true measure of the compaction obtained by the vibration compacting machine.

A number of forces act on the soil compacting machine: the impact force effective between the working part and the soil; the inertia force of the working part; and the excitation force and the pre-loading forces, which are in equilibrium. The maximum value of the impact force obtained when the working part hits the soil represents the value determining soil compaction. The maximum value of the impact force is a multiple of the excitation force and the pre-loading forces. An output signal corresponding to the impact force to be detected can be generated by an acceleration pick-up, the signal from which is proportional to the inertia of the working part.

German Pat. No. 20 66 015 discloses a device for controlling the compaction in vibration compacting machines in which an acceleration pick-up having a vertically moveable guided mass is mounted on the working part with the mass forming the armature of an electromagnet. The magnetic flux of the electromagnet is variable so that a certain retaining force of the electromagnet can be preselected, and thus also a certain acceleration value, at which the armature is torn from the magnet. When such occurs, an induction winding on the electromagnet generates a signal thereby indicating that the preselected acceleration value has been exceeded. Thus, the impact force at the moment the working part strikes the soil then exceeds a predetermined value thereby indicating that a specific degree of soil compaction has been exceeded. Although indicating the degree of compaction exceeded, no indication of the degree of compaction reached is provided.

In another known apparatus for providing an indication of the compaction in vibration compacting machines, preselected observation intervals are defined. Within each interval, it is observed whether a preselected impact force, which is determined by an acceleration pick-up mounted on the working part, is exceeded. If so, the preselected acceleration value is increased; if not, the preselected acceleration value is reduced. The acceleration pick-up is of the same type as described in German Pat. No. 20 66 015. Depending on whether the pick-up has responded, that is whether the predetermined acceleration value has been exceeded, a voltage of positive or negative sign is applied to an integrator, the output of which increases or reduces the current in a winding of the electromagnet via a voltage-to-current transducer. Increasing or decreasing the winding current proportionally increases or decreases the acceleration value at which the armature is torn from the electromagnet. If, within a certain observation interval, the acceleration value determined by the energizing current of the electromagnet is not exceeded, the compaction material therefore is not yet compacted to the degree of compaction corresponding to this acceleration value. Therefore, the energizing current of the electromagnet and thus the preselected acceleration value is reduced through the integrator. Such reduction occurs until the reduced acceleration value is exceeded within an observation interval. Such leads to an inversion of the input voltage of the integrator and to an increase of the preselected value. Thus, the energizing current of the electromagnet varies about a value which corresponds to the obtained degree of compaction. This energizing current provides an indication of the degree of the compaction obtained.

As previously mentioned, the impact forces occuring within each impact of the working part on the soil are dependent on different influences and are statistically distributed. The observation in consecutive observation intervals amounts to taking samples of the impact forces. Quasi-stationary jumping behavior of the working part occurs when compaction is complete. Under such circumstances the variation range of the energizing current, and thus of the predetermined acceleration values, corresponds to the muting interval for the threshold of a certain fractile limit, e.g., the fractile of ninety percent (90%) of the distribution of the relative maximums of the acceleration of the working part when compacting the compaction material. The increase or reduction of the energizing current in the acceleration pick-up depending on whether the predetermined acceleration value is exceeded or not within the observation interval represents simulation of a value of the impact acceleration of the working part which corresponds to a certain fractile limit of the values occuring in the sample.

The compaction indicated in this way is subject to uncertainty due to the periodic variation between upper and lower limits under conditions in which the soil is substantially completely compacted. An indicating instrument, e.g., a meter, monitoring the acceleration value so determined oscillates between upper and lower limits and it can only be determined that the acceleration value, and thus the actual degree of compaction, is located somewhere between these limits. It is possible to reduce the oscillation between these upper and lower limits by reducing the change of the energizing current of the electromagnet and thus the preselected acceleration value. Under such conditions, the indications for consecutive observation intervals vary slowly. When the indication increases, it can only be determined that an acceleration which exceeded the preselected acceleration value occured within the observation interval. An upper limit for the occuring acceleration is not established until after a plurality of observation intervals when the predetermined acceleration in question is no longer exceeded and reversal of movement of the indication takes place. Thus, variations of the degree of compaction of the soil are not indicated substantially as they occur but rather are delayed.

Such past apparatus therefore provide either a heavily oscillating indication, the value of the actual degree of compaction being located anywhere in the variation interval, or a slowly oscillating indication which has a lower level of information and which does not permit the detection of quick variations in the degree of compaction.

SUMMARY OF THE INVENTION

It is the object of this invention to provide a method and apparatus for providing an indication of compaction in vibration compacting machines which reduces the muting interval in the case of quasi-stationary oscillation without extending the response time to variations of the obtained degree of compaction.

It is a more specific object of the invention to provide such a method and apparatus which generates a constant signal under quasi-stationary oscillation behavior.

The method of the instant invention comprises the steps of monitoring the acceleration value of a vibrating working part in a vibration compacting machine. An acceleration value is preselected and compared with the monitored value. A control signal is generated which drives the preselected value toward the monitored value at a rate proportional to the difference between the monitored and preselected value. Apparatus is also provided for implementing the method of the instant invention.

These and other advantages and objects obtained by the instant invention will become more fully apparent when the following detailed description is read in view of the accompanying drawings.

DETAILED DESCRIPTION OF THE PREFERRED EMBODIMENTS OF THE INVENTION

Figure 1:
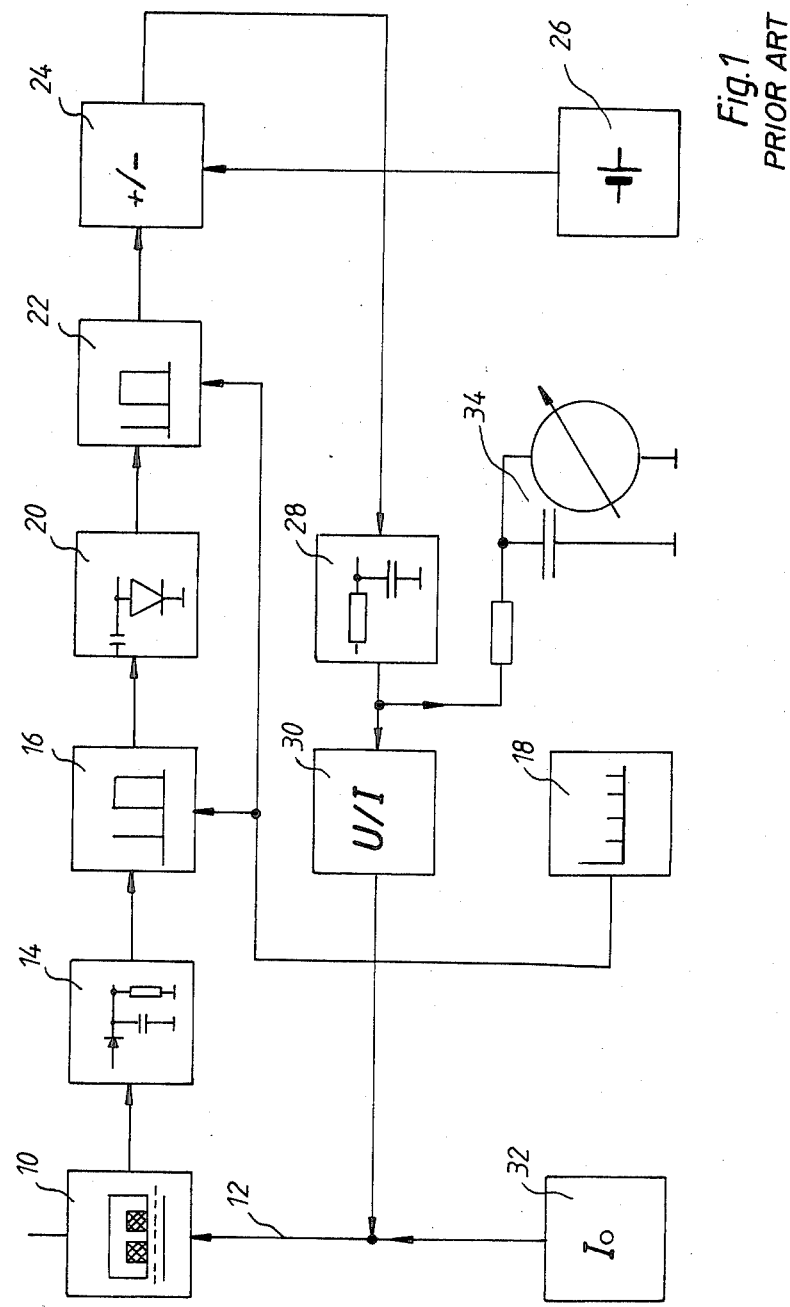
FIG. 1 is a schematic diagram of the prior art device described above in which a preselected acceleration value is varied depending upon whether or not it is exceeded.

For a better understanding of the invention, a description will first be made of a known device, shown in FIG. 1, which has been described generally previously herein. Included in the prior art device is an acceleration pick-up 10, which is of the type disclosed in German Pat. No. 20 66 015. The pick-up includes a vertically moveable guided mass which forms the armature of an electromagnet. The electromagnet receives an energizing current via a current path 12. This energizing current determines the retaining force of the electromagnet and thus also the acceleration value at which the acceleration acting on the mass of the electromagnet armature tears the armature from the electromagnet. When such occurs, an induction winding on the electromagnet generates an output signal. The induction winding is capable of resonant oscillations of about one kilohertz natural frequency due to a parallel capacitance. Within an impact excitation this results in about four complete oscillations. These oscillations are rectified by a discriminator 14 and compared with a constant value. Accordingly, random pulses and stray signals in the line to the acceleration pick-up are impeded. Discriminator 14 triggers a flip-flop 16. The flip-flop is resettable by a pulse generator 18. When flip-flop 16 is reset, a pulse is generated by differentiating network 20 which triggers a second flip-flop 22 which is also resettable by a pulse from pulse generator 18. Flip-flop 22 controls a polarity reversing switch 24. A voltage source 26 is applied with either plus or minus polarity to the input of an integrator 28 under action of the polarity reversing switch. When flip-flop 22 is in its set or high state, switch 24 supplies a positive voltage from source 26 to integrator 28. When flip-flop 22 is in its reset or low state, the voltage so supplied has a negative polarity. Thus, integrator 28 supplies at its output either an increasing or a decreasing ramp signal. The ramp signal is applied to a voltage-to-current transducer 30 and is thus converted to a correspondingly increasing or decreasing current. This current is combined with a current from a constant current source 32 in current path 12. The output signal of integrator 28 is indicated by means of an indicating instrument 34.

Current path 12 together with constant current source 32 and voltage-to-current transducer 30 represent means for preselecting acceleration values at which the armature is torn from the electromagnet in acceleration pick-up 10. Pulse generator 18 is referred to herein as means for preselecting consecutive observation intervals. Flip-flops 16, 22 and differentiating network 20 are referred to herein collectively as means for responding to whether or not the preselected acceleration value is exceeded within each observation interval. Polarity reversing switch 24 and integrator 28 are also referred to as control means for increasing or reducing the preselected acceleration value.

The output signal of the control means, i.e., the output signal generated by integrator 28 is indicative of the obtained compaction. The output signal of the integrator varies by the amount by which the integral of the input voltage varies within an observation interval. A smoothed average of the output voltage does not provide an accurate indication of the degree of the compaction because it is not foreseeable at which moment within the observation interval, and thus at which energizing current of the electromagnet in acceleration pick-up 10, the acceleration value preselected by the energizing current is actually exceeded. Also, with quasi-stationary oscillation behavior, i.e., when the vibration compacting machine operates on regularly-compacted compaction material, the output signal of integrator 28 is subject to such variations.

Figure 2:
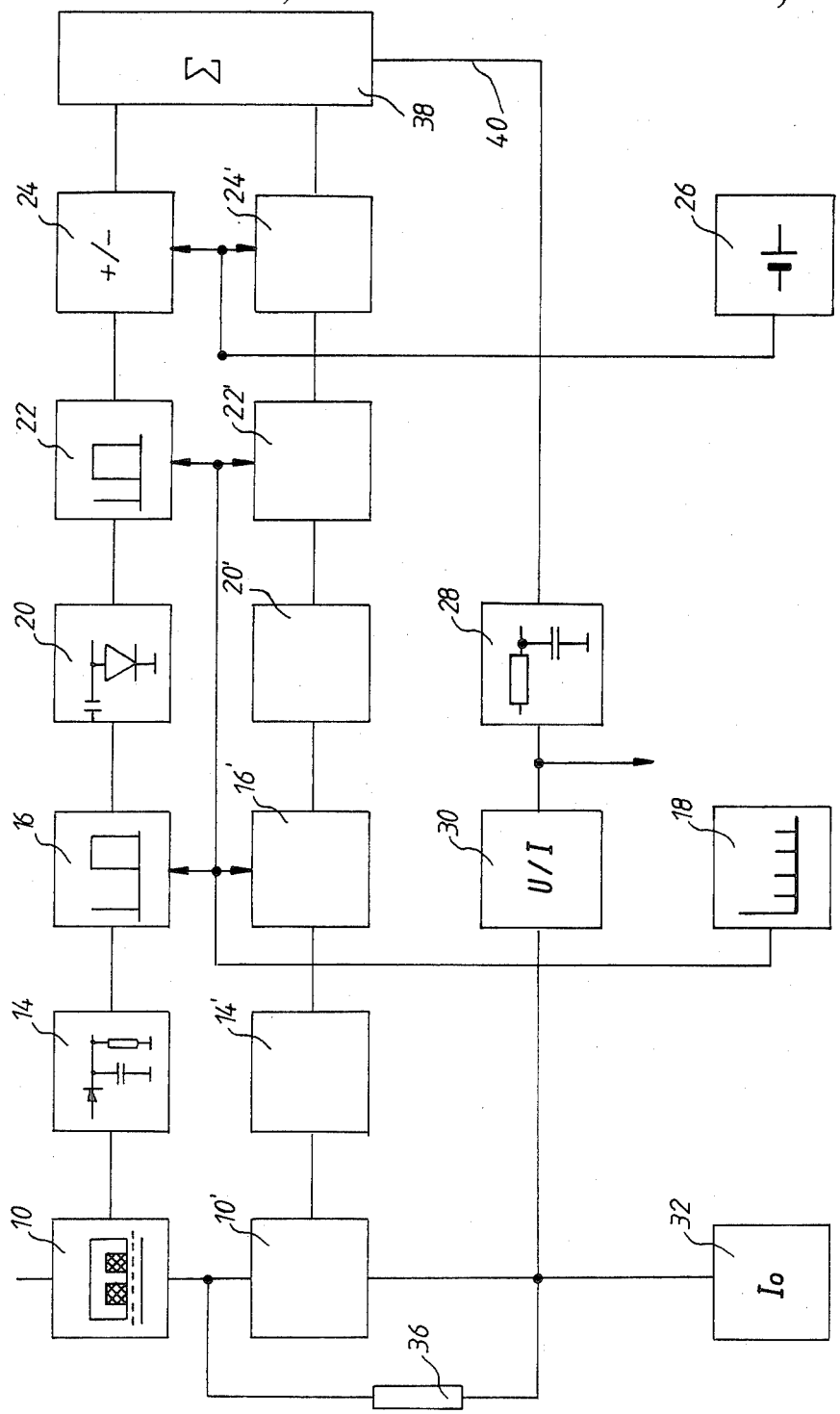
FIG. 2 is a schematic diagram of one embodiment of the apparatus of the present invention having two acceleration pick-ups mounted on the working part, both of which respond to different accelerations.

The embodiment of the apparatus of the instant invention illustrated in FIG. 2 also includes an acceleration pick-up 10 of the type described in German Pat. No. 20 66 015 mounted on the working part. The signal generated by acceleration pick-up 10 is at first processed in the same way as the signal from pick-up in the prior art apparatus shown in FIG. 1. Corresponding portions of FIG. 2 are designated by the same numerals as in FIG. 1.

In the embodiment of FIG. 2, a second acceleration pick-up 10' is mounted on the working part of the vibration compacting machine. The two acceleration pick-ups 10, 10' are rigidly connected to each other and have the same response direction. The signals generated by acceleration pick-up 10' are processed in the same way as signals from acceleration pick-up 10 by signal processing means 14', 16', 20', 22', 24'. The energizing winding of the electromagnet in acceleration pick-up 10' is serially arranged with the energizing winding of the electromagent in acceleration pick-up 10. Thus, the energizing current passing through the energizing winding of the electromagnet in acceleration pick-up 10' is weaker than the current through the energizing winding of acceleration pick-up 10. Therefore acceleration pick-up 10' is more sensitive, with the armature being torn from the electromagnet and thus a signal applied, at lower accelerations. The voltage from voltage source 26 is applied through polarity reversing switches 24, 24' with positive or negative signals to a summing circuit 38 depending upon whether the associated acceleration pick-up responds or not. An output 40 of summing circuit 38 applies an input signal to integrator 28.

In operation, neither acceleration pick-up 10, 10' responds when the accelerations are small. When small accelerations are occuring, the voltage of voltage source 26 is applied with a negative polarity to summing circuit 38 by both polarity reversing switches 24, 24'. The summing circuit therefore supplies a negative signal to output 40. The output signal from integrator 28 therefore is a descending ramp.

If an acceleration occurs within an observation interval which causes acceleration pick-up 10' but not pick-up 10 to respond, polarity reversing switch 24 continues to apply voltage from source 26 with a negative polarity to summing circuit 38. However, polarity reversing switch 24' applies the voltage from source 26 with positive polarity Thus, the sum of the voltage at output 40 of the summing circuit is zero and the output signal of integrator 28 does not vary. If accelerations occur to which both of acceleration pick-ups 10, 10' respond, both polarity reversing switches 24, 24' apply the voltage of source 26 with positive polarity to summing circuit 38 which produces a positive voltage on output 40 thus generating a rising output signal from integrator 28 during the next observation interval.

Quasi-stationary oscillation behavior of the vibration compacting machine produces a state in which generally acceleration pick-up 10' responds and acceleration pick-up 10 does not respond thus resulting in a stationary output signal.

Figure 3:
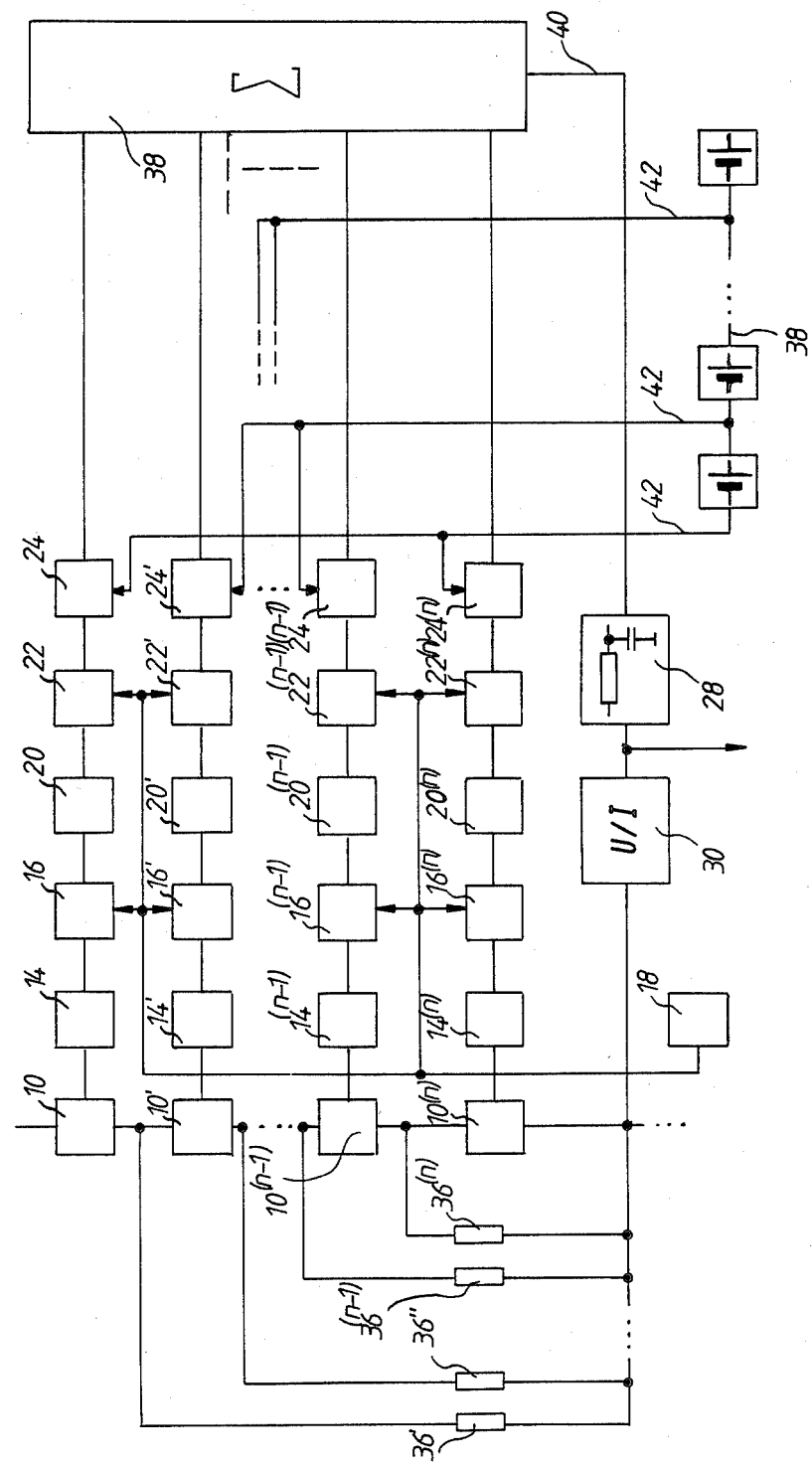
FIG. 3 is a schematic diagram of a second embodiment of the apparatus of the invention similar to that shown in FIG. 2 with a larger number of acceleration pick-ups.

In the embodiment of FIG. 3, instead of two acceleration pick-ups 10, 10', a plurality of acceleration pick-ups 10, 10' . . . $10^{(n-1)}$, $10^{(n)}$ are provided. The energizing winding of the electromagnets of the acceleration pick-ups 10, 10' . . . etc. are connected in series. Stepped resistors 36, 36' . . . $36^{(n-1)}$, $36^{(n)}$ are connected in parallel as shunts to the energizing windings of the acceleration pick-ups so that the acceleration pick-ups have a stepped sensitivity similar to the different sensitivities of pick-ups 10, 10' in FIG. 2. The armature of acceleration pick-up 10 is torn from its electromagnet at a relatively considerable acceleration thereby causing pick-up 10 to generate a signal. The armature of acceleration pick-up $10^{(n)}$ is torn from its corresponding electromagnet at a relatively small acceleration thereby causing pick-up $10^{(n)}$ to generate a signal. Thus, acceleration pick-ups 10—$10^{(n)}$ determine a stepped sequence of acceleration values with each pick-up responding when its associated value is exceeded. Acceleration pick-ups 10—$10^{(n)}$ are rigidly connected with each other and with the working part of the vibration compacting machine and have the same response directions, like pick-ups 10, 10' in FIG. 2.

Signals supplied by each acceleration pick-up 10—$10^{(n)}$ when responding are processed in an associated circuit which is numbered to correspond to components 14, 16, 20, 24 in FIGS. 1 or 2. Instead of a single voltage source 26 as in FIG. 1 or 2, a voltage source device 39 is provided which applies a stepped sequence of voltages to pick-offs 42. Each of pick-offs 42 is connected through two of polarity reversing switches 24, 24' . . . $24^{(n)}$ to the summing circuit. The highest voltage is supplied to polarity reversing switches 24, $24^{(n)}$, which switches are associated with the highest and lowest of the preselected acceleration values which in turn are associated with the most insensitive and the most sensitive acceleration pick-up 10, $10^{(n)}$, respectively. The second highest voltage is supplied to polarity reversing switches 24', $24^{(n-1)}$ which are each associated with the second highest and second preselected acceleration values which in turn are associated with pick-up $10'$, $10^{(n-1)}$, respectively. Preferably, an even number of acceleration pick-ups $10$—$10^{(n)}$ are provided.

Depending on whether an accleration pick-up, for example $10'$, responds or not, the associated polarity reversing switch $24'$ is so switched during the following acceleration interval that it applies voltage from device 39 with negative or positive signs to summing circuit 38. Output 40 of the summing circuit is applied to an integrator 28 which corresponds to that shown in FIG. 2 and is not fully illustrated again in FIG. 3 for the sake of clarity.

In operation, at very low accelerations, none of the acceleration pick-ups respond. This produces a negative signal on output 40 of the summing circuit. Therefore, energizing current of acceleration pick-ups $10$—$10^{(n)}$ is reduced by maximum rate during the following observation interval. At considerable accelerations, all of acceleration pick-ups $10$—$10^{(n)}$ respond. This results in a positive signal of maximum amount on ouptut 40 of the summing circuit. Thus, the energizing current of the electromagnets in acceleration pick-ups $10$—$10^{(n)}$ is increased at maximum rate. When only a part of the acceleration pick-ups respond, positive or negative voltage between the maximum and minimum positive and negative responses is produced on output 40 of summing circuit 38. If exactly half of acceleration pick-ups $10$—$10^{(n)}$ respond, then the negative voltage supplied through polarity reversing switch 24 and the positive voltage supplied through the polarity reversing switch $24^{(n)}$ neutralize each other. Correspondingly, the negative voltage applied through polarity reversing switch $24'$ and the positive voltage supplied through polarity reversing switch $24^{(n-1)}$ neutralize each other, etc. This results in a voltage of zero on output 40 of summing circuit 38.

In the embodiment shown in FIG. 3, a quasi-stationary jumping behavior of the vibration compacting machine results in a constant output signal because the input signal of integrator 28 is zero. Additionally, the variation of the stepped acceleration values during the following observation interval depends on the amount by which the highest acceleration observed in the preceding observation interval varies from the mean value of the preselected stepped acceleration values.

Figure 4:
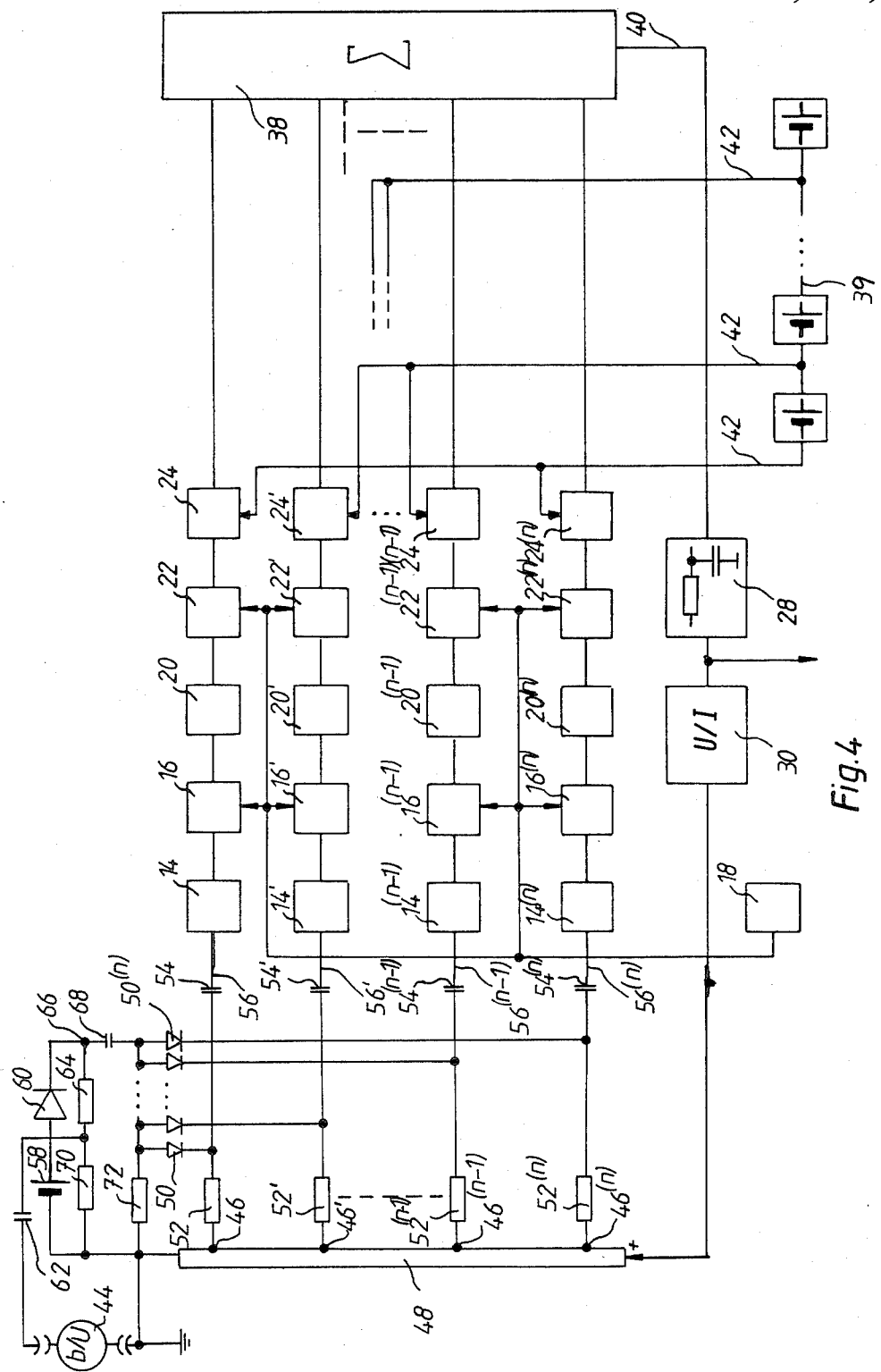
FIG. 4 is a schematic diagram of a third embodiment of the apparatus of the instant invention using an analog accelerometer.

Numbers which have been previously used to identify structure again appear in FIG. 4 to identify corresponding structure. A single analog accelerometer 44 is mounted on the working part (not shown) to monitor acceleration. Accelerometer 44 generates an analog signal proportional to acceleration. A potentiometer 48, having one end connected to ground and the other end connected to the output of voltage-to-current transducer 30, includes a number of taps 46, $46'$ ... $46^{(n)}$ at which selected fractions of the potential drop across potentiometer 48 appear. Potentiometer 46 is referred to herein as means for providing a stepped sequence of potentials.

A plurality of diodes 50, $50'$ ... $50^{(n)}$ each have their cathodes connected to a conductor associated with a corresponding tap 46, $46'$ ... $46^{(n)}$. A resistor 52, $52'$ ... $52^{(n)}$ is interposed between an associated tap 46, $46'$ ... $46^{(n)}$ and the cathode of its associated diode. The cathode of each diode is connected via an associated capacitor 54, $54'$ ... $54^{(n)}$ and an associated signal line 56, $56'$ ... $56^{(n)}$ to differentiators 14, $14'$ ... $14^{(n)}$, respectively. Diodes 50, $50'$ ... $50^{(n)}$, resistors 52, $52'$ ... $52^{(n)}$, and capacitors 54, $54'$ ... $54^{(n)}$ are referred to herein as means for determining which of said stepped acceleration values is exceeded.

A constant voltage source 58 has its negative end grounded and its positive end connected to the annode of diode 60. A capacitor 62 conducts the signal from accelerometer 44 to the junction between resistors 64, 79. The cathode of diode 60 and the other side of resistor 64 are common to a junction 66 which is connected via a capacitor 68 to the annodes of diodes 50, $50'$ ... $50^{(n)}$. The side of resistor 70 opposite the resistor 70, 64 junction is grounded. Finally, a resistor 72 has one side grounded and the other side connected in common to the annodes of diodes 50, $50'$ ... $50^{(n)}$.

In operation, accelerometer 44 generates an analog signal proportional to the acceleration of the working part which is applied via capacitor 62 to the junction between resistors 70, 64. Capacitor 62 provides for suppression of the direct current component of the output signal from the accelerometer which represents acceleration caused by gravity. Voltage source 58 serves to provide a well-defined voltage which is added to the analog signal at the junction between resistors 70, 64. Voltage source 58 corresponds to constant current source 32 in FIGS. 1 and 2. The signals thus obtained are compared through differently biased diodes 50, $50'$ ... $50^{(n)}$ with the potentials of pick-offs 46, $46'$, etc. If the potential of the biased accelerometer signals on the anodes of diodes 50, $50'$, etc. is higher than the potential of the associated tap on resistor 48, a current passes through the diodes and signal is generated on associated signal line 56, $56'$, etc. which triggers, in the previously-described way, the first flip-flop in the corresponding signal processing circuit.

The remainder of the arrangement functions in the same way as that described in connection with the embodiment of FIG. 3. The embodiment of FIG. 4 generally replaces the individual acceleration pick-ups having electromagnets with a single analog accelerometer 44 as described above.

Figure 5:
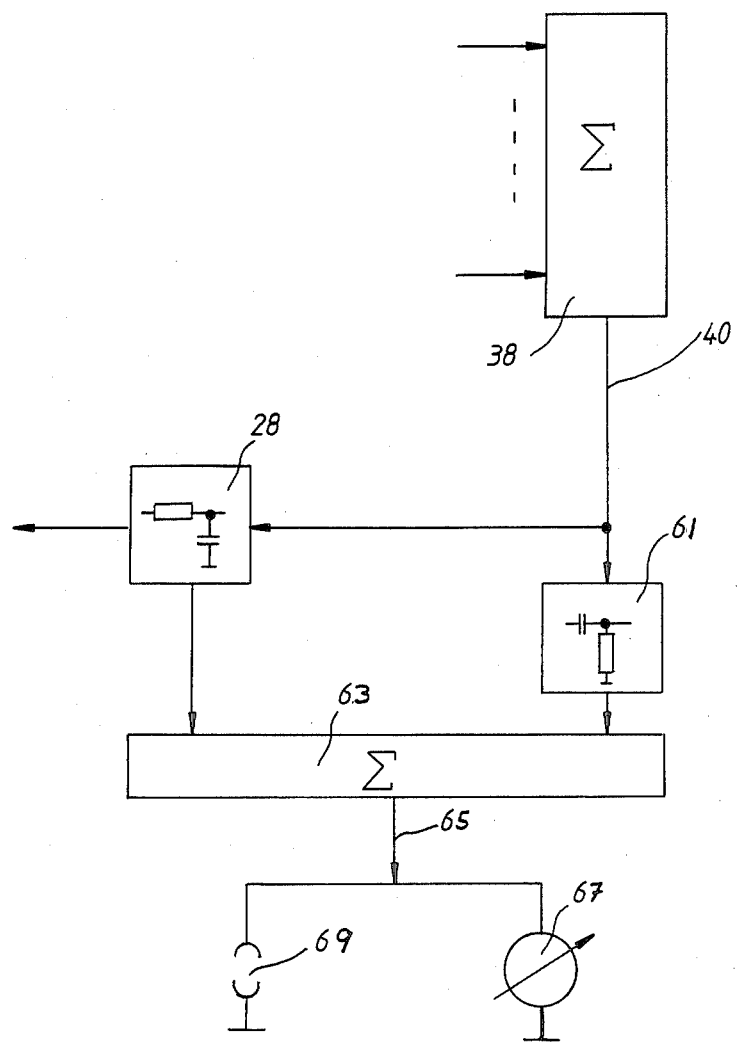
FIG. 5 is a schematic diagram of a fourth embodiment of the apparatus of the invention which is a modification of the embodiments shown in FIGS. 3 or 4.

A modification of the device of FIGS. 2-4 is illustrated in FIG. 5 with the connections to integrator 28 and summing circuit 38 being as shown in FIGS. 2-4. Output 40 of summing circuit 38 is connected to a differentiating network 61. The time constant of network 61 is substantially the same as the time constant of integrator 28. The outputs of integrator 28 and network 61 are connected to a summing circuit 63. Output 65 of summing circuit 63 is connected to an analog indicating instrument 67 and to an attachment 69 for a recorder. Indicating instrument 67 corresponds to indicating instrument 34 of FIG. 1.

Substantially retangular pulses appear on output 65 which include spikes that appear each time pulse generator 18 pulses. This square-wave may be constant in several consecutive observation intervals. The amount of the square-wave voltage in each observation interval corresponds to the observed value for the compaction with regard to the distance covered by the vibrating compaction machine in the preceding observation interval. This will not be true when either all or none of the acceleration pick-ups in FIGS. 2 or 3 have supplied a signal via lines 56, $56'$ ... $56^{(n)}$ during the observation interval.

Figure 6:
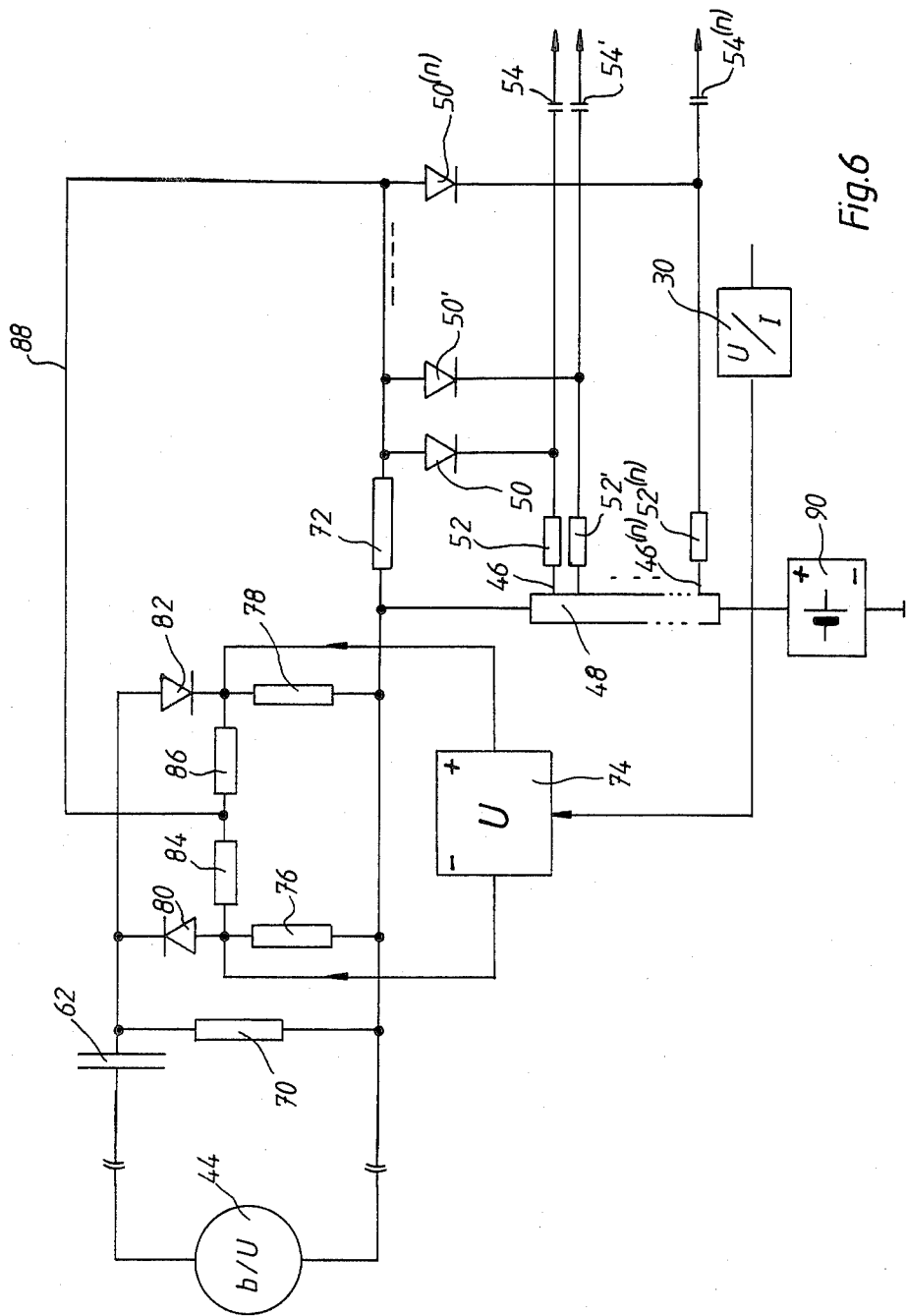
FIG. 6 is a schematic diagram of a fifth embodiment of the apparatus of the invention which is a modification of the embodiment shown in FIG. 4.

FIG. 6 is a diagram of an embodiment similar to that of FIG. 4 and corresponding elements are designated by the same numerals as in FIG. 4. In the embodiments of FIGS. 3 and 4, when the preselected acceleration values, represented by the voltages appearing on the taps of resistor 48, are varied up or down by the current from voltage-to-current transducer 30, the distance between each preselected acceleration value varies at the same time. Thus, the control means influences the spacing of the preselected acceleration values and there is a coarser classing of the preselected acceleration values when the output of transducer 30 is large than when it is small. This is undesirable for a number of reasons.

In the embodiment of FIG. 6, the extent of the intervals between the preselected values is not influenced by the control means. To this end, current from voltage-to-current transducer 30 is not supplied to potentiometer 48 but rather is applied to vary the voltage of a voltage source corresponding to voltage source 58 in FIG. 4.

A variable voltage source 74 is connected via a conductor as shown to transducer 30 and generates a potential difference proportional to the current from transducer 30. This potential difference is applied across the diagonal of a bridge circuit which is formed by resistors 76, 78 and diodes 80, 82 with the positive terminal of source 74 being connected to the cathode of diode 82 and the negative terminal of source 74 being connected to the annode of diode 80. Accelerometer 44 is connected through capacitor 62 to the other bridge diagonal. A pair of resistors 84, 86 are serially arranged in the first diagonal of the bridge circuit in parallel with source 74. A bridge output signal is tapped between resistors 84, 86 by a line 88. This output signal is applied in conducting direction to diodes 50, 50' ... 50$^{(n)}$. A constant voltage source 90 is applied across potentiometer 48.

In operation, a voltage proportional to the acceleration of the working part is applied to line 88 through diode 80 and resistor 84 or through diode 82 and the resistor 86 depending upon its polarity. The potential of line 88 and of the junction between resistors 84, 86 relative to ground is also affected by voltage source 74. Thus, the potential of the signals generated by accelerometer 44 are shifted as a function of current from voltage-to-current transducer 30. The signal appearing on line 88 is referred to herein as a summed signal. The potentials on potentiometer taps 46, 46' ... 46$^{(n)}$ are constant as is the voltage difference betwen adjacent taps.

Figure 7:
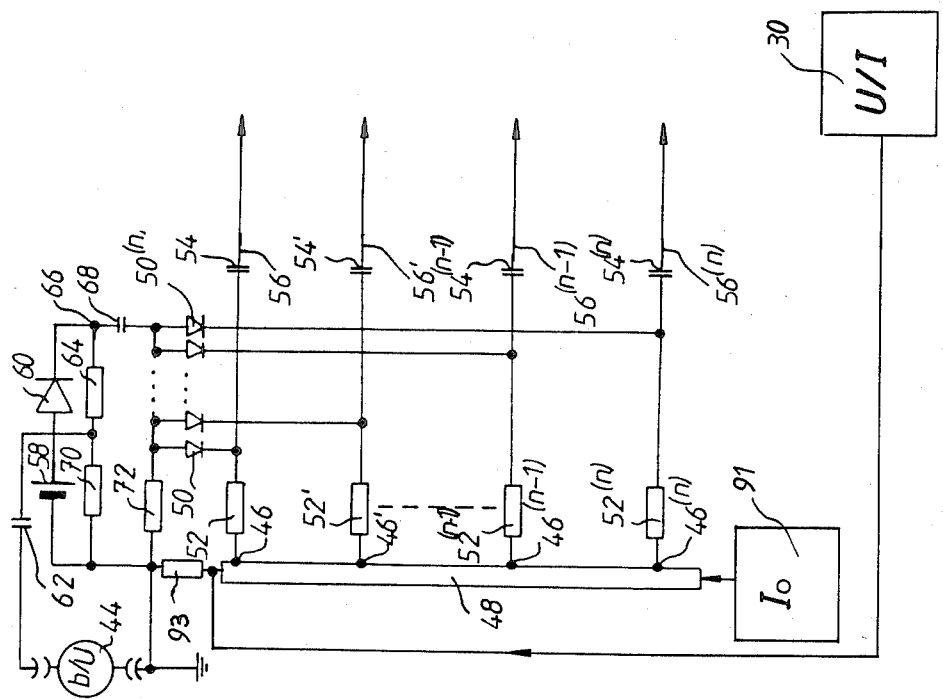
FIG. 7 is a schematic diagram of a sixth embodiment of the apparatus of the invention which is a modification of the embodiment shown in FIG. 4.

FIG. 7 shows a further modification to the embodiment of FIG. 4 in which, as in the embodiment of FIG. 6, the distance between adjacent acceleration values of the stepped sequence is independent of the observed maximum acceleration value represented by the signal on the output of transducer 30. Potentiometer 48 is supplied with a constant current from a constant current source 91. A fixed resistor 93 is connected in series with potentiometer 48. Current from the voltage-to-current transducer 30 passes only through resistor 93 and not through potentiometer 48. Thus, a common shift of the potentials of pick-offs 46, 46' ... 46$^{(n)}$ is produced but the total voltage across potentiometer 48 and the voltage between adjacent taps remains constant.

Figure 8:
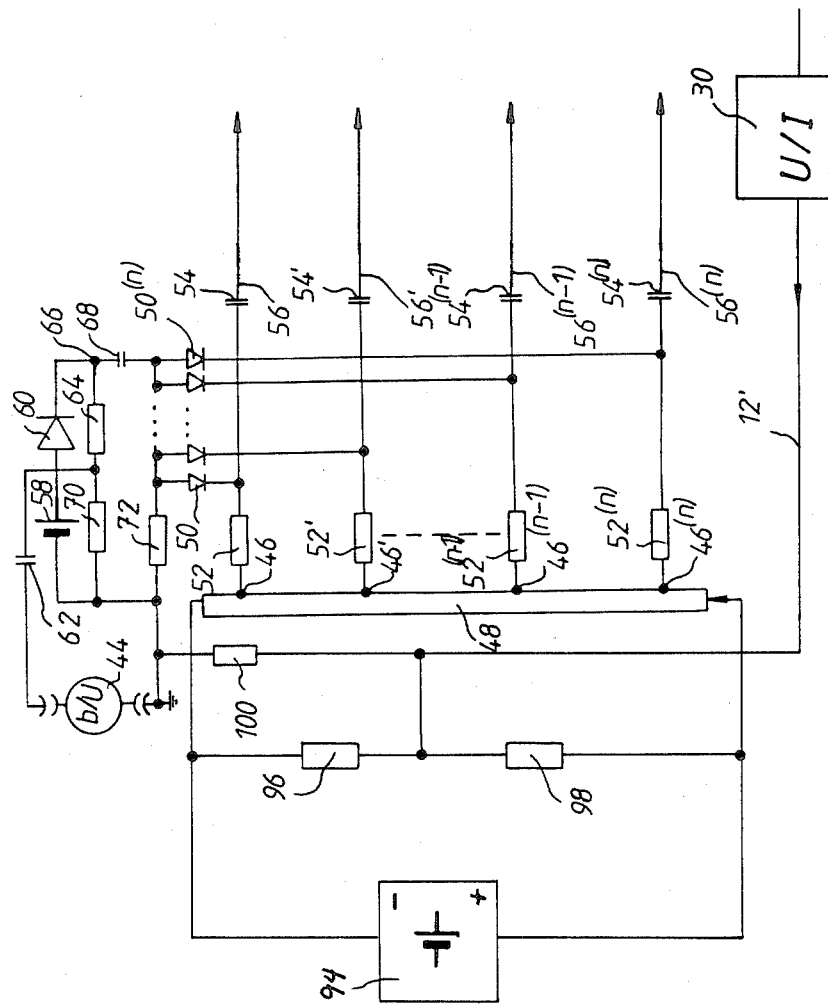
FIG. 8 is a schematic diagram of a seventh embodiment of the apparatus of the instant invention which is a modification of the embodiment shown in FIG. 4.

FIG. 8 is an arrangement similar to that shown in FIG. 7 but with a constant voltage source 94 being used instead of a constant current source. Constant voltage source 94 is applied across potentiometer 48 and resistors 96, 98 as shown. Current from transducer 30 passes through a resistor 100. The junction of resistors 96, 98 is in common with the junction between resistor 100 and the output of transducer 30. As the voltage drop across resistor 100 varies, the potential of the junction of resistors 96, 98 relative to ground also varies thus varying the potentials of taps 46, 46' ... 46$^{(n)}$ without variation of the voltage between adjacent taps.

Figure 9:
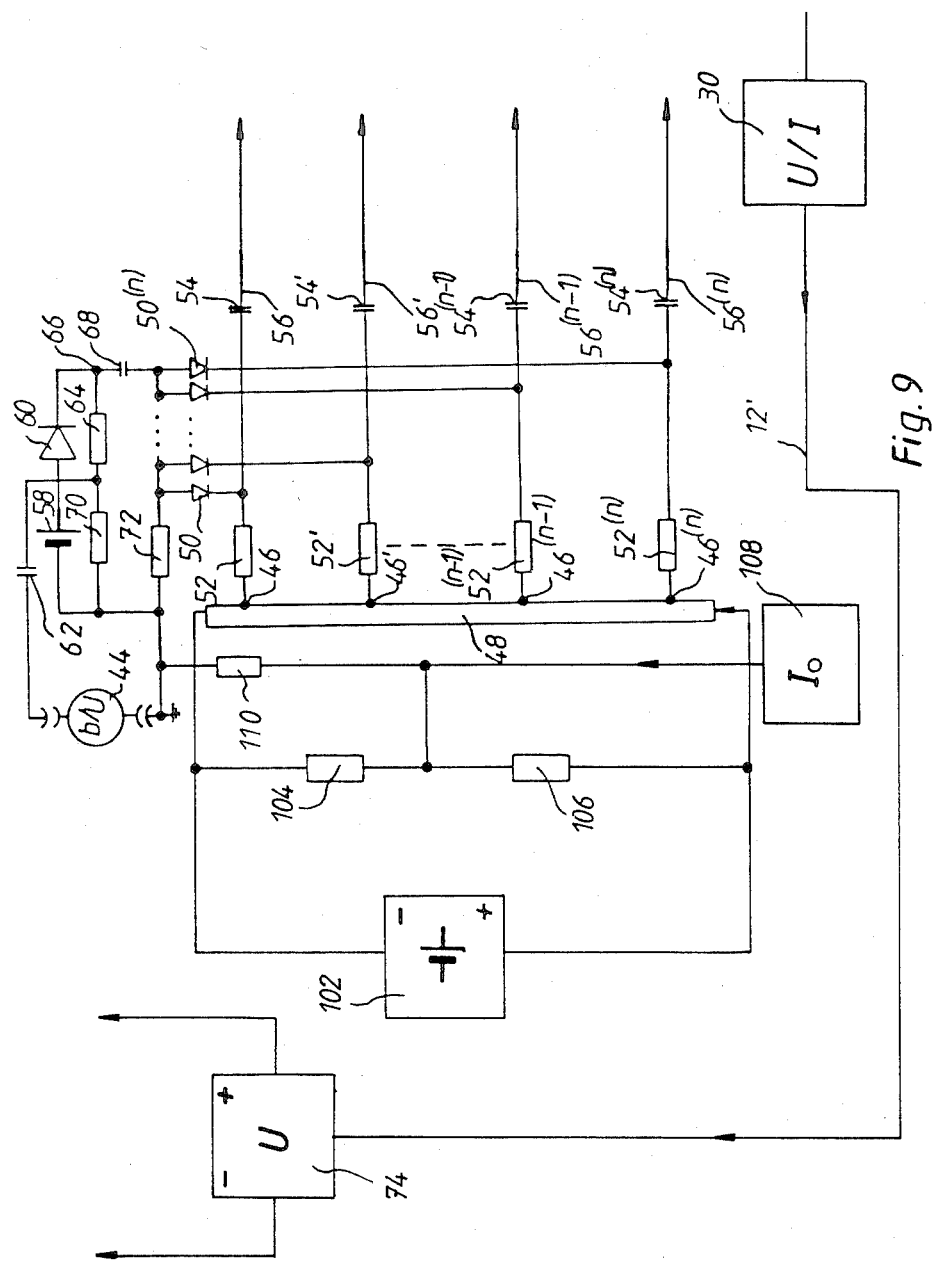
FIG. 9 is a schematic diagram of an eighth embodiment of the apparatus of the instant invention which is a modification of the embodiment shown in FIG. 4.

FIG. 9 is a diagram of an arrangement similar to that shown in FIG. 6 in which potentials of the signals of accelerometer 44 are variable by an adjustable voltage source 74. Corresponding elements in FIG. 9 are designated by the same numerals as in FIG. 6. In the embodiment of FIG. 9, an adjustable voltage source 102 is applied across potentiometer 48. A series circuit of resistors 104, 106 is connected in parallel with source 102 and potentiometer 48. A constant current source 108 supplies a current through a resistor 110 the other side of which is connected to the junction of accelerometer 44 and resistor 72 (ground). The arrangement of potentiometer 48 is similar to that in the embodiment of FIG. 8; however, current from voltage-to-current transducer 30 does not pass through resistor 110. Current from transducer 30 controls the voltage from voltage source 74. A constant current source passes through resistor 110. Voltage source 102 may be selectively varied to vary the potential across potentiometer 48 as well as the distance between the potentials of adjacent taps of the potentiometer. In this manner, the spacing between the selected sequence of preselected acceleration values may be selectively varied.

The prior art devices as well as the previously-described embodiments herein do not supply an output signal which is a suitable estimation of the parameter to be determined. A suitable estimation of a parameter of a distribution, as in the compaction of a soil represented by the impact acceleration, is one which converges toward a well-defined value when the observation is continued indefinitely. When a suitable estimation of the parameter is not possible due to general variations of soil characteristics, a measure of such variations is not provided. If the compaction section is absolutely regular, it is possible to obtain a value of the compaction indication free from variance with the previously-described embodiments of the apparatus of the invention; however, this value cannot be unambiguously associated with the soil. Thus, it does not represent an unambiguous parameter estimation. Each other estimated value within the distance between preselected accleration values leads to the same indication. When, on the other hand, the soil characteristics vary, this is true as well because each mean value formed has to remain uncertain within at least the smallest class. Accordingly, the parameter estimation only has a finite resolution which is finally deterined by the instrumentation.

Figure 10:
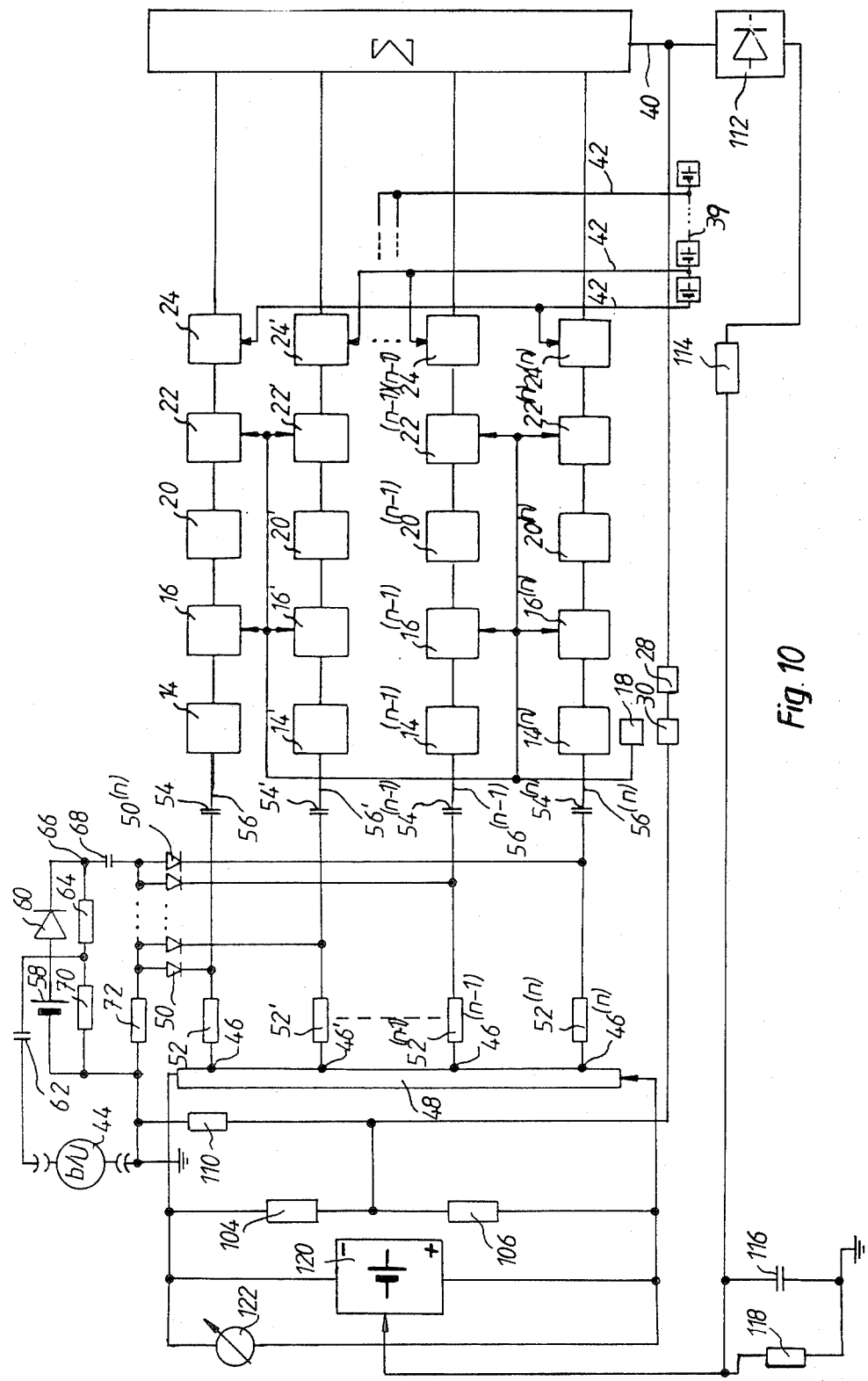
FIG. 10 is a schematic diagram of a ninth embodiment of the apparatus of the invention which is a modification of the embodiment shown in FIG. 8.

It is the object of the arrangement of FIG. 10 to provide a device for providing an indication of compaction in vibration compacting machines which has an output signal that is a suitable estimation of the parameter to be determined. Alternatively, when such is not possible due to general variation of the soil characteristics, a measure of the variations is provided as a second output.

The embodiment of FIG. 10 is constructed similar to the embodiment of FIG. 8 and corresponding elements in FIG. 10 are designated by the same numerals as FIG. 8 and as in FIG. 3. Output 40 of summing circuit 38 is additionally applied to a full-wave rectifier 112. The output of the rectifier, which represents the absolute value of this signal, is applied through a resistor 114 to a delay network comprising capacitor 116 and a resistor 118 connected in parallel. The rise time of the delay network is determined by resistor 118 and is selected to be several seconds. Thus, for rapid variations of the control signal, i.e., the output of transducer 30, signals are not simulated at signal outputs 56, 56' . . . 56$^{(n)}$ The delay network is connected to a variable voltage source 120 which generates an output voltage proportional to the voltage applied thereto. The output voltage is displayed on an indicating instrument 122.

In operation, with a constant signal generated by accelerometer 44, the output of summing circuit 38 and also the output of delay network 116, 118 is zero after transient phenomena have decayed. Thus, voltage of controllable voltage source 120 is adjusted to zero and no voltage is applied across potentiometer 48. The acceleration values preselected by the potentials on taps from potentiometer 48 coincide. Since the distance between the lowest and highest preselected acceleration value is converging, the uncertainty of the parameter estimation, i.e., estimation of the maximum acceleration within an interval, is asymptotically compensated. Thus, indicating instrument 122 indicates zero, i.e., no variations in soil compaction.

When a disturbance occurs, i.e., when an acceleration maximum varying from the stationary value is observed in an observation interval, voltage source 120 is turned on nearly spontaneously. When such maximums vary at about the same intensity, the device tends to "center" the classing limits. in the way described above through integrator 28 and through transducer 30. The output of delay network 116 and 118 serve to widen the distance between preselected acceleration values just to the extent which is necessary for the stability of the centering. When the maximums vary more from the stationary value, indicating instrument 122 indicates the more than proportional output signal to summing circuit by considerable deflection. Thereby the user can recognize that the reading of indicating instrument 34 only represents short-time value. By widening the distance between preselected acceleration values, the indications relatively quickly become steady again. In addition, the indicating instrument 122 indicates the increased uncertainty still existing therewith.

Instead of varying potentials of the taps 46 of potentiometer 48 by current through resistor 110 as in FIG. 8, potentials of accelerometer signals in an arragnement of the type of FIG. 10 can also be varied in the manner illustrated in FIG. 9.

It is to be appreciated that variations and additions to the embodiments of the invention disclosed herein may be made without departing from the spirit thereof which is defined in the following claims.

I claim:

1. Apparatus for indicating compaction in vibration compacting machines of the type having a vibrating working part, an acceleration pick-up attached to said vibrating working part, means to pick-up acceleration values during consecutive observation intervals, and means responsive to the preselected acceleration value to produce an output signal indicative of the obtained compaction, said apparatus comprising:
   means for preselecting a sequence of stepped acceleration values by which intermediate acceleration intervals are defined;
   means responsive to said means for preselecting for determining which of said stepped acceleration values is exceeded during an observation interval; and
   indicating means operatively connected to said means for determining for providing an indication of the acceleration.

2. The apparatus of claim 1 wherein said means for preselecting a sequence of stepped acceleration values comprises at least two acceleration pick-ups having different threshold values attached to said working part, said acceleration pick-ups responding to acceleration values by providing a signal.

3. The apparatus of claim 2 which further comprises:
   a vertically movable guided mass mounted on each acceleration pick-up, said mass forming the armature of an electromagnet, each electromagnet being adapted for providing different magnetic fluxes thereby providing correspondingly different retaining forces; and
   an induction winding mounted on each electromagnet, said winding being adapted to generate a signal when said armature is torn from said electromagnet.

4. The apparatus of claim 2 which further comprises:
   a series of first flip-flops, each of which is operatively connected to said means for determining which of said stepped acceleration values is exceeded;
   a pulse generator, the pulses from said pulse generator being adapted to reset said first flip-flops;
   a differentiating network connected to the output of each of said first flip-flops, said differentiating network supplying a pulse at the rear flank of the output signal from each of said first flip-flops;
   a series of second flip-flops, said differentiating network pulses being applied to the input of each of said second flip-flops;
   a polarity reversing switch operatively connected to each of said second flip-flops, said switch changing polarity responsive to activation and deactivation of its associated flip-flop;
   a summing circuit operatively connected to said switches and being adapted to have a voltage applied thereto through each of said polarity reversing switches; and
   an integrator having an input operatively connected to said summing circuit, said preselected acceleration values being controlled by the output of said integrator.

5. The apparatus of claim 4 which further includes a voltage source device for providing a stepped sequence of voltage to pick-offs, each of said pick-offs being connected through two of said polarity reversing switches to said summing circuit such that the highest voltage is supplied to the polarity reversing switches associated with the highest and the lowest of said preselected stepped acceleration values, the second-highest voltage is supplied to the polarity reversing switches associated with the second-highest and the second lowest stepped acceleration values, etc.

6. The apparatus of claim 5 wherein said indicating means is operatively connected to the output of said integrator.

7. The apparatus of claim 4 which further includes a voltage-to-current transducer, the output of said integrator being operatively connected thereto.

8. The apparatus of claim 7 wherein said potentiometer is operatively connected to said voltage-to-current transducer, said potentiometer conducting the current generated by said transducer.

9. The apparatus of claim 7 which further comprises:

a resistor connected in series with said potentiometer, the current from said voltage-to-current transducer passing only through said resistor; and a constant-current source, said potentiometer being operatively connected thereto for conducting the current generated by said source.

10. The apparatus of claim 4 wherein said means for providing a stepped sequence of potentials comprises a voltage divider having a plurality of pick-offs and wherein said apparatus further comprises a controllable voltage source applied to said voltage divider, the voltage of said voltage source being controlled by variations from the output of said integrator.

11. The apparatus of claim 10 wherein said voltage source is controlled by the output of said summing circuit.

12. The apparatus of claim 11 which further includes a delay network, the output of said summing circuit being applied to a control input of said voltage source through said delay network.

13. The apparatus of claim 10 which further includes an indicating instrument for indicating the voltage of said controllable voltage source.

14. The apparatus of said claim 1 wherein said acceleration pick-up comprises an analog accelerometer, said means for preselecting a sequence of stepped acceleration values comprises means for providing a stepped sequence of potentials, and said means for determining which of said stepped acceleration values is exceeded comprises:

a series of diodes to which the signal from said accelerometer is supplied in conducting direction;

a series of resistors through which said diodes are each biased by one of said stepped sequence of potentials to render said diodes non-conducting; and a series of capacitors through which said diodes and resistors are connected.

15. The apparatus of claim 14 wherein said means for providing a stepped sequence of potentials comprises a potentiometer having a plurality of pick-offs.

16. The apparatus of claim 14 wherein said control means is adapted for varying the potential of the signals from said accelerometer.

17. A method for providing an indication of compaction in vibration compacting machines of the type having a vibrating working part comprising the steps of:

monitoring the acceleration of said vibrating working part to derive a monitored value;

preselecting an acceleration value;

comparing said preselected value with said monitoring value; and generating a control signal for driving said preselected value toward said monitored value at a rate proportional to the difference between the monitored and preselected values.

18. The method of claim 17 wherein said step of preselecting an acceleration value includes:

preselecting a sequence of stepped acceleration values; and counting the number of steps between said monitored value and said preselected value.

19. The method of claim 17 which further includes the steps of:

generating a summed signal which varies in proportion to the sum of said acceleration value and said monitored value; and varying said control signal at a rate proportional to the difference between said summed signal and said preselected value.

20. The method of claim 19 wherein said step of preselecting an acceleration value includes:

preselecting a sequence of stepped accleration values; and counting the number of steps between said monitored value and said preselected value.

21. Apparatus for providing an indication of compaction in vibration compacting machines of the type having a vibrating working part, said apparatus comprising:

an acceleration monitor mounted on said working part, said monitor generating a first signal proportional to the acceleration of said working part;

means for generating a second signal indicative of a preselected acceleration value;

means for generating third signals indicative of a range of stepped acceleration values, said second signal having a value of substantially one half of said range;

means for comparing said first signal with said second signal; and means for driving said second signal toward said first signal.

22. The apparatus of claim 21 wherein said third signal generating means comprises a resistor connected to a constant current source and having a series of varying potential taps.

23. The apparatus of claim 22 wherein said driving means comprises a variable current source for providing current through said resistor.

24. The apparatus of claim 22 wherein said driving means comprises a variable voltage source for placing voltage across said resistor.

25. The apparatus of claim 21 which further includes means for determining whether said first signal exceeds each of said third signals during a predetermined observation interval.

26. The apparatus of claim 25 which further includes summing means operatively connected to said means for determining whether said first signal exceeds each of said third signals, said summing means generating a composite signal having a magnitude proportional to the difference between said first and second signals.

27. An apparatus for providing an indication of compaction in vibration compacting machines of the type having a vibrating working part, said apparatus comprising:

means for monitoring the acceleration of said vibrating working part;

means for preselecting an acceleration value;

means for comparing said preselected value with said monitored value; and means for generating a control signal for driving said preselected value toward said monitored value at a rate proportional to the difference between the monitored and preselected values.

28. The apparatus of claim 27 wherein said means for preselecting and acceleration value comprises:

means for preselecting a sequence of stepped acceleration values; and means for counting the number of steps between said monitored signal and said preselected signal.

29. The apparatus of claim 28 which further includes means for varying said stepped acceleration values proportional to said control signal.

30. The apparatus of claim 27 wherein said apparatus further includes:
 means for generating a summed signal which varies in proportion to the sum of said acceleration value and said monitored value; and
 means for varying said control signal at a rate proportional to the difference between said summed signal and said preselected value.

31. An apparatus for providing an indication of compaction in vibration compacting machines of the type having a vibrating working part, said apparatus comprising:
 an acceleration monitor mounted on said working part, said monitor generating a first signal proportional to the acceleration of said working part;
 a resistor having a series of variable potential taps;
 a power source for creating a potential difference across said resistors;
 a comparison circuit for comparing the magnitude of said first signal with the magnitude of the signal appearing on each of said variable potential taps when said power source is energized, said comparison circuit generating a different output signal for each variable potential tap when said first signal exceeds the potential thereon; and
 a summing circuit for summing said output signals, said summing circuit generating a signal indicative of the degree of compaction.

32. The apparatus of claim 31 wherein said apparatus further includes means for varying said power source and wherein said indicative signal is supplied to said power source varying means for varying the power source proportional to said indicative signal.

33. The apparatus of claim 32 wherein said means for vasrying said power source comprises:
 a variable voltage source applied across a resistor; and
 a time delay circuit operatively connected to said variable voltage source and said summing circuit.

* * * * *